(12) United States Patent
Stancanelli et al.

(10) Patent No.: US 9,136,918 B2
(45) Date of Patent: Sep. 15, 2015

(54) DYNAMIC CLUSTERING FOR COORDINATED TRANSMISSION IN WIRELESS COMMUNICATION SYSTEMS

(75) Inventors: Elvis M. G. Stancanelli, Fortaleza (BR); Tarcisio Maciel, Fortaleza (BR); Yuri C. B. Silva, Fortaleza (BR); Walter da Cruz Freitas, Jr., Fortaleza (BR); Francisco R. P. Cavalcanti, Fortaleza (BR)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 191 days.

(21) Appl. No.: 13/482,118

(22) Filed: May 29, 2012

(65) Prior Publication Data

US 2013/0267239 A1 Oct. 10, 2013

Related U.S. Application Data

(60) Provisional application No. 61/621,647, filed on Apr. 9, 2012.

(51) Int. Cl.
*H04W 72/00* (2009.01)
*H04B 7/02* (2006.01)

(52) U.S. Cl.
CPC ....................................... *H04B 7/024* (2013.01)

(58) Field of Classification Search
USPC ........................................................ 455/446
See application file for complete search history.

(56) References Cited

U.S. PATENT DOCUMENTS

| | | | | |
|---|---|---|---|---|
| 7,035,240 | B1* | 4/2006 | Balakrishnan et al. | 370/338 |
| 2008/0026733 | A1* | 1/2008 | Jaatinen | 455/414.2 |
| 2008/0309554 | A1* | 12/2008 | Venkatesan | 342/367 |
| 2010/0041407 | A1* | 2/2010 | Caire et al. | 455/446 |
| 2010/0278157 | A1* | 11/2010 | Zuniga et al. | 370/338 |

OTHER PUBLICATIONS

A. Papadogiannis; "The Value of Dynamic Clustering of Base Stations for Future Wireless Networks"; 2010 IEEE International Conference on Fuzzy Systems (FUZZ); Jul. 18-23, 2010; pp. 1-6; Barcelona, Spain.
Boccardi, et al.; "Limited Downlink Network Coordination in Cellular Networks"; 18th Annual IEEE International Symposium on Personal, Indoor and Mobile Radio Communications (PIMRC); Sep. 2007; pp. 1-5; Swindon, UK.
A. Papadogiannis; "A Dynamic Clustering Approach in Wireless Networks with Multi-Cell Cooperative Processing"; IEEEE International Conference on Communications (ICC); May 2008; pp. 1-6; Sophia-Antipolis, France.

(Continued)

*Primary Examiner* — Joel Ajayi
(74) *Attorney, Agent, or Firm* — Patent Portfolio Builders PLLC

(57) ABSTRACT

Systems and methods provide for applying a clustering based assignment algorithm (CbAA) in a telecommunication system. A method includes: receiving strength information for transmission points belonging to an associated Coordinated Multi-Point (CoMP)-cell; determining the clustering subsets, wherein the step of determining the clustering subsets includes: applying a k-means algorithm to the strength information to form K clusters; identifying the cluster associated with each UE; associating a cluster to each transmission point in accordance to a pre-defined rule; and selecting the UEs to be serviced; and reporting the clustering formations.

18 Claims, 7 Drawing Sheets

(56) References Cited

OTHER PUBLICATIONS

F. Huang; "Clustering Approach in Coordinated Multi-Point Transmission/Reception System"; Vehicular Technology Conference Fall (VTC 2010-Fall); Sep. 6-9, 2010; pp. 1-5; Ottawa, Ontario, Canada.

P. Hansen, et al.; "Cluster analysis and mathematical programming"; in Mathematical Programming, vol. 79, No. 1-3; Oct. 1997; pp. 191-215; Montreal, Canada.

E. M. G. Stancanelli, et al.; "Application of Dynamic Clustering into CoMP Systems"; Federal University of Ceara, Wireless Telecommunications Research Group (GTEL); Sep. 2-5, 2011; pp. 1-5; Fortaleza-CE, Brazil.

E. M. G. Stancanelli, et al.; "Clustering-based Assignment within CoMP Systems"; 2013 IEEE 24th International Symposium on Personal, Indoor and Mobile Radio Communications: Mobile and Wireless Networks; Federal University of Ceara, Wireless Telecommunications Research Group (GTEL); Sep. 8-11, 2013; pp. 2270-2274; London, UK.

\* cited by examiner

DYNAMIC CLUSTERING FOR COORDINATED TRANSMISSION IN WIRELESS COMMUNICATION SYSTEMS

RELATED APPLICATION

This application is related to, and claims priority from, U.S. Provisional Patent Application No. 61/621,647, entitled "Dynamic Clustering Method for Coordinated Transmission in Wireless Communication Systems", filed on Apr. 9, 2012, the disclosure of which is incorporated here by reference.

TECHNICAL FIELD

The present invention generally relates to radio communication apparatuses and methods used for improving cellular networks by using a clustering approach in Coordinated Multi-Point (CoMP) systems.

BACKGROUND

As more devices use cellular networks, and the amount of data/applications desired for use by users in the cellular networks increases, it will become more challenging for network operators to meet the demand of their users. One technology which has been seen to be a way to boost the link capacity is the Multiple Input Multiple Output (MIMO) technology. Similarly, a newer technology known as Coordinated Multi-Point (CoMP) systems can be seen as a way to boost the capacity of cellular networks.

Each cell of a CoMP system, a so-called "CoMP-cell" or, in a more general context, also known as a "supercell", is typically composed of several geographically distributed Transmission Points (TPs) connected through a fast backhaul to a Central Processing Unit (CPU). Under adequate processing circumstances, multiple TPs can simultaneously service multiple User Equipments (UEs). However, the coordination complexity in CoMP systems grows with the size of the set of TPs to be coordinated. The network infrastructure bears the cost of increased overhead in several facets: UE's feedback, backhaul traffic, and central processing.

In order to reduce complexity, coordination can be restricted to occur just within subsets or clusters of TPs. The cluster size is the common factor affecting all the aforementioned overhead facets as described in the article "The Value of Dynamic Clustering of Base Stations for Future Wireless Networks" by Papadogiannis and Alexandropoulos found in IEEE International Conference on Fuzzy Systems (FUZZ), 2010, pp. 1-6. The set of all available TPs belonging to a CoMP-cell can be partitioned into clusters, i.e., mutually exclusive subsets of TPs. Thus, each cluster can be seen as a distributed antenna array, which services the UEs associated with it.

Traditionally, the approaches for forming the TP clusters are classified into static and dynamic, depending on how frequently the clusters' composition is updated, however, semi-dynamic approaches are known as well. Examples of static approaches can be found in, the article "Limited Downlink Network Coordination in Cellular Networks" by Boccardi and Huang found in Proc. IEEE International Symposium on Personal, Indoor and Mobile Radio Communications (PIMRC), September 2007, pp. 1-5. Examples of dynamic approaches can be found in the article "The Value of Dynamic Clustering of Base Stations for Future Wireless Networks" by Papadogiannis and Alexandropoulos found in IEEE International Conference on Fuzzy Systems (FUZZ), 2010, pp. 1-6, and in the article "A Dynamic Clustering Approach in Wireless Networks with Multi-cell Cooperative Processing" by Papadogiannis et al. found in Proc. IEEE International Conference on Communications (ICC), May 2008, pp. 4033-4037. Examples of semi-dynamic approaches can be found in the article "Clustering Approach in Coordinated Multi-Point Transmission/Reception System" by Huang et al. found in Vehicular Technology Conference Fall (VTC 2010-Fall), 2010 IEEE $72^{nd}$, 2010, pp. 1-5.

Static clustering is the simplest approach, which requires fixed grouping of TPs, based for example on the TPs' positions and antenna radiation patterns. For semi-dynamic clustering, the clusters are fixed as well, although multiple layers of these configurations are provided, so that a UE at the cell's edge in a layer is at the cell's center in another layer. In the dynamic clustering approach, the form of the clusters can be adapted to current channel and load conditions, thus allowing a radio communication system to better exploit the available macroscopic spatial diversity. However, each of these approaches as currently described have their own challenges, some of which are described below.

The static clustering approach has its performance penalized for not adapting the cluster form to temporal variations of the traffic loads. Semi-dynamic clustering approaches, like that described in the article "Clustering Approach in Coordinated Multi-Point Transmission/Reception System" by Huang et al. found in Vehicular Technology Conference Fall (VTC 2010-Fall), 2010 IEEE $72^{nd}$, 2010, pp. 1-5, attempt to overcome this limitation, albeit partially. For example, one semi-dynamic approach requires prior planning of the layers, tightly related to the TP deployment, as well as to foreseen demands for coordination. However, in any other situation the coordination within the cluster may not be efficient or it may even be harmful to other transmissions.

Dynamic approaches seem to be the most suitable ones for adapting the cluster forms to the many different changes on the channel and traffic conditions, whether temporal or spatial. Nonetheless, the algorithms published so far, e.g., in the references described above, are not fully adequate since the algorithms restrict the size of the clusters and they demand substantial computational processing.

The process of cluster formation involves TP selection and is tightly related to UE scheduling and coordinated transmission. The so-called "greedy algorithm" described in the article "A Dynamic Clustering Approach in Wireless Networks with Multi-cell Cooperative Processing" by Papadogiannis et al. found in Proc. IEEE International Conference on Communications (ICC), May 2008, pp. 4033-4037, depends on a broad and sequential combination of candidate TPs, favoring the clusters formed earlier. Furthermore, at each combination tested by the greedy algorithm, Zero-Forcing (ZF) precoders have to be computed in order to determine the sum-rate, therefore involving a number of matrix inversion operations, whose complexity scales up cubically with the cluster size. Alternatively, and unlike this maximum sum-rate approach, the algorithm proposed in the article "The Value of Dynamic Clustering of Base Stations for Future Wireless Networks" by Papadogiannis and Alexandropoulos found in IEEE International Conference on Fuzzy Systems (FUZZ), 2010, pp. 1-6, is based on a long-term Channel State Information (CSI) and requires an exhaustive search over all possible cluster formations.

Accordingly, more efficient systems and methods for use in CoMP systems are desirable.

SUMMARY

Systems and methods according to the present invention address this need and other by providing systems and methods for using a clustering approach in Coordinated Multi-Point (CoMP) systems, wherein instead of directly clustering the transmission points or user equipments, an exemplary method can first cluster the user equipments' strength information, e.g., strength vectors. By using the exemplary subscription systems and methods described herein, there can be a significant reduction of the signaling overhead in a communication system. It will be appreciated by those skilled in the art, however, that the invention is not limited to those embodiments which produce any or all of these advantages or benefits and that other advantages and benefits may be realized depending upon the particular implementation.

According to an exemplary embodiment, there is a system for applying a clustering based assignment algorithm (CbAA) in a telecommunication system, the system includes: means for receiving strength information for transmission points belonging to an associated Coordinated Multi-Point (CoMP)-cell; means for determining the clustering subsets, wherein the means for determining the clustering subsets includes: means for applying a k-means algorithm to the strength information to form K clusters; means for identifying the cluster associated with each UE; means for associating a cluster to each transmission point in accordance to a pre-defined rule; and means for selecting the UEs to be serviced; and means for reporting the clustering formations.

According to an exemplary embodiment, there is a method for dynamically determining clusters of user equipments (UEs) and transmission points (TPs) in a communication system including: receiving signal strength information associated with a plurality of UEs and TPs; and dynamically determining clusters of the plurality of UEs and TPs using a pattern recognition technique and the received signal strength information.

According to another exemplary embodiment, there is a central processing unit (CPU) for dynamically determining clusters of user equipments (UEs) and transmission points (TPs) in a communication system, the CPU comprising: an interface configured to receive signal strength information associated with a plurality of UEs and TPs; and a processor configured to dynamically determine clusters of the plurality of UEs and TPs using a pattern recognition technique and the received signal strength information.

According to an exemplary embodiment, there is a method for applying a clustering based assignment algorithm (CbAA) in a telecommunication system. The method includes receiving strength vectors, wherein each strength vector depends on Received Signal Strength (RSS) estimates of a user equipment (UE) for all of the transmission points belonging to an associated Coordinated Multi-Point (CoMP)-cell; determining the clustering subsets; and reporting the clustering formations.

The method can further include enabling all of the clustering subsets. Alternatively, the method can include enabling a subset of all of the clustering subsets. In one embodiment, the telecommunication system can use frequency division duplexing. In another embodiment, the telecommunication system can use time division duplexing.

According to an exemplary embodiment, the step of determining the clustering subsets can be performed by executing the CbAA which includes the steps of: applying a k-means algorithm to the strength information to form K clusters; identifying the cluster associated to each UE; calculating prototype vectors; associating a cluster to each transmission point in accordance to a pre-defined rule; and selecting the UEs to be preferentially serviced. According to an exemplary embodiment, the step of selecting the UEs to be preferentially serviced is performed by using a best fit algorithm.

According to another exemplary embodiment, there is a central processing unit (CPU) for applying a clustering based assignment algorithm (CbAA) in a telecommunication system. The CPU receives strength vectors, wherein each strength vector depends on Received Signal Strength (RSS) estimates of a user equipment (UE) for all of the transmission points belonging to an associated Coordinated Multi-Point (CoMP)-cell; determining the clustering subsets; and reports the clustering formations.

According to another exemplary embodiment, there is a method for applying a k-means clustering based assignment algorithm (CbAA) in a telecommunication system. The method includes receiving strength vectors, wherein each strength vector depends on Received Signal Strength (RSS) estimates of a user equipment (UE) for all of the transmission points belonging to an associated Coordinated Multi-Point (CoMP)-cell; simultaneously determining the clustering subsets which include both UEs and Transmission Points (TPs) by using the k-means CbAA; and reporting the clustering formations.

According to another exemplary embodiment; a method for dynamically determining clusters of user equipments (UEs) and transmission points (TPs) comprises: receiving received signal strength information associated with a plurality of UEs and TPs, and dynamically determining clusters of the plurality of UEs and TPs using a pattern recognition technique and the received signal strength information. The determined clusters can be signaled to the TPs and/or the UEs for usage in, for example, joint precoding and/or coordinated data transmission scheduling within clusters. The pattern recognition technique can, for example, be a k-means clustering algorithm. The k-means clustering algorithm can operate to form clusters by minimizing a within-cluster sum of squares of the distances to their centroids.

According to another embodiment, a method for dynamically determining clusters of user equipments (UEs) and transmission points (TPs) comprises: receiving received signal strength information associated with a plurality of UEs and TPs and dynamically determining clusters of the plurality of UEs and TPs using the received signal strength information and a k-means clustering algorithm which forms the clusters by minimizing a within-cluster sum of squares of the distances to their centroids. The determined clusters can be signaled to the TPs and/or the UEs for usage in, for example, joint precoding and/or coordinated data transmission scheduling within clusters.

Other embodiments relate to nodes or CPUs which perform the methods described in this Summary section. The nodes or CPUs can include one or more processors which are configured to perform the method steps which are set forth in the various methods above. Still other embodiments relate to TPs whose clusters have been dynamically determined or formed using the above-described methods.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. However, the embodiments to be discussed next are not limited to these systems but may be applied to other similar radio communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is an efficient method for dynamically clustering Transmission Points (TPs) to be used for coordinated transmission. To do this, a proposed method uses estimates of User Equipments' (UEs') strength vectors, where a strength vector depends on Received Signal Strength (RSS) estimates of a UE for all of the TPs belonging to its Coordinated Multi-Point (CoMP)-cell. This exemplary method reduces the complexity, compared to prior art solutions for dynamic approaches, since (1) the exhaustive search over all possible cluster formations is not required and (2) in the case of joint precoding as the transmission scheme, precoder calculations also are not performed during the clustering formation procedure, which further reduces the relative complexity.

Figure 1:
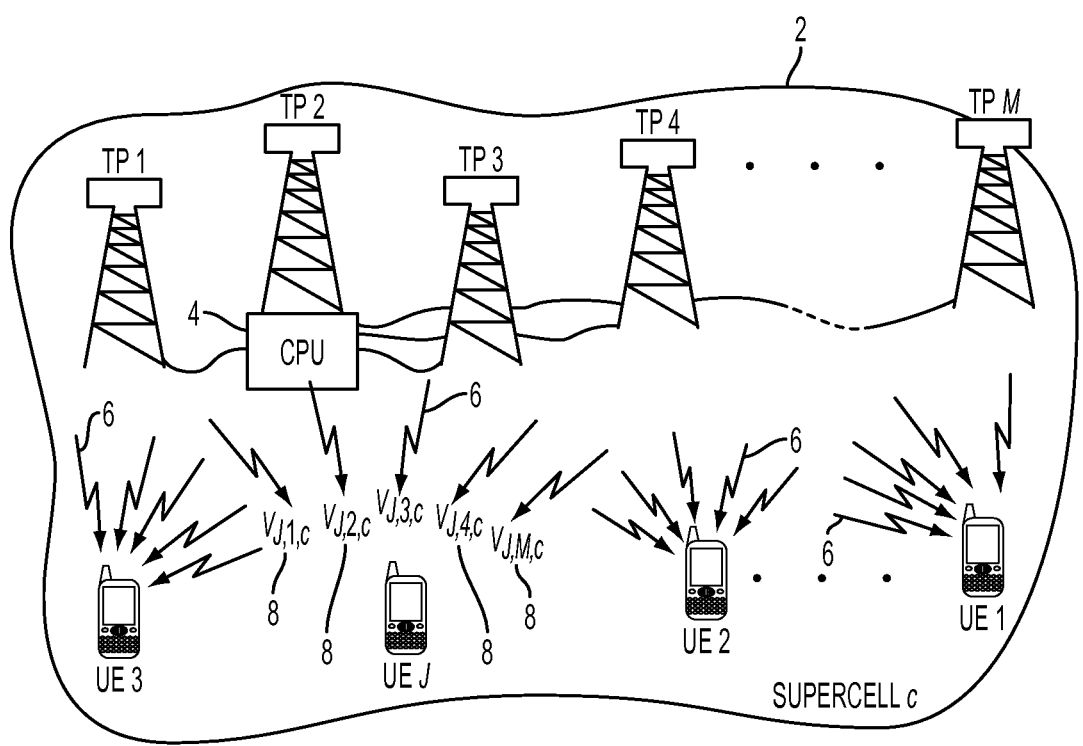
FIG. 1 depicts a model of a supercell and its main entities according to an exemplary embodiment.

Prior to describing the various exemplary embodiments in more detail, an architecture in which the exemplary embodiments can be implemented is now described with respect to FIG. 1. FIG. 1 depicts a basic model of a supercell 2 and its main entities. These main entities include, a central processing unit (CPU) 4, a plurality of TPs, e.g., TP 1, TP 2 . . . TP M, and a plurality of UEs, e.g., UE 1, UE 2 . . . UE J. Additionally signaling between the central processing unit (CPU) 4, the TPs and the UEs is represented by the signaling arrows 6. The signaling arrows 6 can also represent the $V_{j,m,c}$ 8 which denotes the Received Signal Strength (RSS), directly or as modified by a mapping function, related to a UE j and TP m of the supercell c 2. More details are provided below in the use and interrelationship of these elements.

According to an exemplary embodiment, instead of directly clustering the TPs or UEs, an exemplary method can first cluster the UEs' strength vectors. Inspired by a pattern recognition viewpoint, the method groups the UEs' strength vectors into clusters so that strength vectors assigned to a same cluster have some kind of similarity among themselves, while strength vectors belonging to different clusters can be highly dissimilar. These clusters are mutually exclusive subsets, and each cluster has its own profile which can be observed through centroid measures. Assuming a suitable choice of the number of clusters, each cluster's centroid will be very close to all assigned strength vectors. After clustering the strength vectors, coordinated subsets can be created throughout a supercell 2. Each coordinated subset can be determined by a group of TPs and another group of UEs to be potentially serviced.

According to an exemplary embodiment, in each supercell 2 the CPU 4 (or the equivalent) gathers all required estimates and redistributes them when necessary. The CPU 4 can also execute the cluster formation, assignment and scheduling procedures as well as calculate the transmission parameters. Additionally, the CPU 4 can communicate the decisions to the involved UEs and TPs.

According to an exemplary embodiment, the supercell 2 can be divided into a plurality of clusters. Each cluster has a plurality of TPs and UEs each of which can comprise one disjoint subset of TPs and one disjoint subset of UEs to be serviced. These disjoint subsets can be based upon strength vectors which have some kind of similarity among themselves. In this example, supercell 2 has K clusters as shown by cluster 1 10, cluster 2 12 . . . and cluster K 14. According to an exemplary embodiment, a single CPU 4 can perform the processing for all of the clusters in supercell 2. However, according to an alternative exemplary embodiment, more than one processing unit can be used and these processors can be located in an integrated unit, or separated into one or more physical entities if desired.

According to an exemplary embodiment, a clustering approach can be employed to alleviate the signaling and the processing involved in CoMP transmissions. Once the clusters are formed, specific scheduling and transmission procedures can be performed in every cluster, such as coordinated beamforming and coordination of transmission power. More exemplary details for implementing these embodiments are now described, beginning with a description of a system model and its assumptions.

Figure 2:
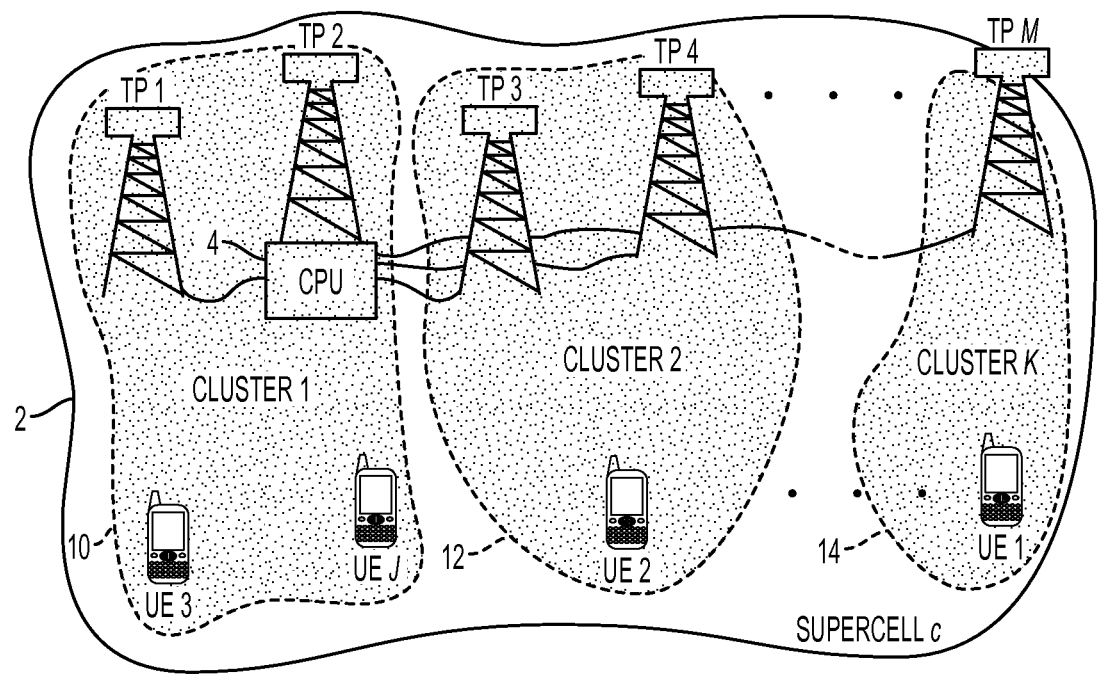
FIG. 2 shows a model of a supercell with some formed clusters according to an exemplary embodiment.

According to an exemplary embodiment, the system has a number C of supercells, indicated by c=1, 2, . . . , C, each of them with a CPU 4 controlling a number M of TPs, indicated by m=1, 2, . . . , M. Here we focus on the downlink transmission, in which each supercell 2 services a number J of UEs, indicated by j=1, 2, . . . , J. As described above, FIG. 1 depicts the basic model of supercell c 2 which includes the UEs, TPs and CPU entities. In addition, K clusters can be formed, each of them comprising one disjoint subset of TPs and one disjoint subset of UEs to be serviced, as shown in FIG. 2.

Continuing with the system model, let $\mathcal{M} = \{1, 2, \ldots, M\}$ be the active set comprising all the TPs belonging to the supercell c 2, and $\mathcal{J}$ be the set with all UEs intended to receive data in the supercell 2. The subsets of indices of TPs and of UEs associated to cluster k are respectively $\mathcal{M}_k$ and $\mathcal{J}_k$, whose cardinalities are $M_k$ and $J_k$, respectively. Additionally, the subset of the preferentially serviced UEs is defined as $\mathcal{J}_k^* \subseteq \mathcal{J}_k$. Let $\mathcal{K}$ be the set with all k=1, . . . , K cluster indices. For every cluster k∈$\mathcal{K}$ the TPs in m∈$\mathcal{M}_k$ will service the UEs j∈$\mathcal{J}_k^*$.

According to an exemplary embodiment, a method described herein can work over the entire downlink bandwidth or parts thereof, tightly related to the RSS measurement scope. For example, if an RSS estimate is available for each Resource Block (RB) of a 3rd Generation Partnership Project (3GPP) system, methods can be applied on an RB-by-RB basis. If the RSS estimates are restricted to wideband measures, such as the Reference Signal Received Power (RSRP) or Received Signal Strength Indicator (RSSI) used in Long Term Evolution (LTE), the method can be applied as for a single resource corresponding to the whole bandwidth. Therefore, any interference or dependence among different resources can be neglected. This allows for dispensing with the use of an index for specifying the resources.

According to an exemplary embodiment, the RSS can be directly measured at the receiver, derived from the Signal to Noise Ratio (SNR) or from any other appropriate channel measurement. Let $V_{j,m,c}$ denote the RSS, directly or modified by a mapping function, related to UE j and TP m of supercell c 2. The strength vector of UE j comprising all TPs belonging to supercell c 2 can be defined as $v_{j,c}=[V_{j,1,c}\ V_{j,2,c}\ \ldots V_{j,M,c}]^T$. If the RSS from some TPs cannot be estimated or is not available for a given UE, the corresponding entries of its strength vector can be set to the lowest value possible to be estimated. The CPU 4 gathers all strength vectors from all UEs in its supercell 2 before running a clustering algorithm.

Coming from the pattern recognition research field, cluster analysis can be described as an unsupervised method useful for assigning a set of observations into mutually exclusive subsets or clusters. Observations assigned to a same cluster have some kind of similarity among themselves. Observations belonging to different clusters should be as dissimilar as possible. For further information regarding cluster analysis, the interested reader is pointed to the article "Cluster Analysis and Mathematical Programming" in Mathematical Programming, vol. 79, no. 1-3, pp. 191-215, October 1997 by P. Hansen and B. Jaumard found in Mathematical Programming, vol. 79, no. 1-3, pp. 191-215, October 1997, which is incorporated herein by reference.

According to an exemplary embodiment, the strength vector $v_{j,c}$, with length M, is associated to UE j within supercell c 2. Each strength vector is taken as a simple observation to be analyzed, however not all observations need to be taken into account. The set $\mathcal{U}$ can be defined as all of the UEs present within supercell c 2. The set $\mathcal{J}$ of UEs to be further considered by the assignment algorithm can be pre-selected from them, i.e., $\mathcal{J} \subseteq \mathcal{U}$, whose cardinality is defined by $J=|\mathcal{J}|\leq|\mathcal{U}|$. These J observations are disposed in the $\mathbb{R}^M$ space and then partitioned into K clusters in accordance with the subsets $\mathcal{J}_k$ for every $k \in \mathcal{K}$. The number of clusters K can vary over time and supercells, e.g., different supercells can have a different number of clusters K. Since, for simplicity, this embodiment is restricted to a single supercell c 2, we omit the index c for simplicity of notation, i.e., $v_{j,c}=v_j$.

Let $\mathcal{V}$ be the set with the strength vectors $v_j$ for every $j \in \mathcal{J}$. Every clustering will result in subsets of these observations, $\mathcal{V}_k$, for all $k \in \mathcal{K}$, disjoint of each other, so that:

$$\mathcal{V} = \bigcup_{k=1}^{K} \mathcal{V}_k, \qquad (1)$$

$$\mathcal{V}_{k_1} \cap \mathcal{V}_{k_2} = \emptyset, \qquad (2)$$
$$\forall \mathcal{V}_{k_1}, \mathcal{V}_{k_2} \in \mathcal{V}: k_1 \neq k_2,$$

and a cluster formation instance is denoted as $S=\{\mathcal{V}_1, \mathcal{V}_2, \ldots, \mathcal{V}_k\}$. The cardinalities $|\mathcal{V}_k|$ are not necessarily the same.

According to an exemplary embodiment, the proposed method is based on the k-means clustering algorithm. In that algorithm, clusters are formed to minimize the within-cluster sum of squares of the distances to their centroids:

$$\min_{S} \sum_{k} \sum_{v_j \in \mathcal{V}_k} \|v_j - \bar{v}_k\|_2^2, \qquad (3)$$

where $\|\cdot\|$ denotes Euclidean norm and $\bar{v}_k$ is the kth prototype vector. In its turn, the kth prototype vector corresponds to the centroid over all the strength vectors associated to cluster k and can be expressed as:

$$\bar{v}_k = \frac{\sum_{v_j \in \mathcal{V}_k} w_j v_j}{\sum_{j \in \mathcal{J}_k} w_j}, \qquad (4)$$

wherein $w_j \in \mathbb{R}^+$ is the weight assigned to the jth UE according to how one wants it to influence the calculation of the centroid. For example, one could prioritize one or more UEs such that the corresponding prototype vector approaches their strength vectors. Alternatively, a weighting mechanism can be directly built into the mapping function of the RSS as previously described. The centroid tends to be closer to the strength vectors of those UE assigned with the highest weights. For the particular case in which one does not want to favor specific UEs, equation (4) can be rewritten as:

$$\bar{v}_k = \frac{1}{|\mathcal{V}_k|} \sum_{v_j \in \mathcal{V}_k} v_j. \qquad (5)$$

According to an exemplary embodiment, initially the K centroids can be initialized randomly or dictated by some heuristic, e.g., select K observations at random, select K points in the $\mathbb{R}^M$ space at random while respecting the range of the observations or use the centroids previously obtained from a clustering performed over a subset of observations. Then, the assignment of observations according to equation (3), and the recalculation of centroids according to equation (4) (or equation (5)), are iteratively performed until a stop criterion is met. Some examples of stop criteria include: achieving a maximum number of iterations or reaching a point where there is no significant change in the clusters.

According to an exemplary embodiment, each prototype vector $\bar{v}_k$ is an approximate strength vector valid to every $v_j \in \mathcal{V}_k$. The closer the strength vectors of all UEs within a same cluster are, the more representative for them the prototype vector will be. For each cluster k, the prototype vector $\bar{v}_k$ can be employed for determining the subset $\mathcal{M}_k$ of TPs to service the UEs $j \in \mathcal{J}_k$. The algorithm employed to form a given cluster k looks for UEs that can be serviced with an adequate level of quality by this same subset of TPs.

According to an exemplary embodiment, a proposed assignment algorithm, based on the aforementioned k-means, is described herein for a given group of available TPs. The assignment algorithm can be run by the CPU 4 of each supercell 2, after estimates of strength vectors from all UEs of interest are available as the set $\mathcal{V}$.

The k-means algorithm can then be applied over $\mathcal{V}$ to form K clusters. Once the clusters are properly formed in the $\mathbb{R}^M$ space, we know which $J_k$ strength vectors will be associated to each cluster k and thereby the prototype vector $\bar{v}_k$ can be calculated by (4) (or (5)). As each strength vector is directly associated to a UE, we immediately know the $J_k$ UEs to be potentially serviced within cluster k, i.e., the subset $\mathcal{J}_k$ is determined. All K prototype vectors are compared to each other, TP-by-TP, in order to form $\mathcal{M}_k$ for every k∈$\mathcal{K}$.

According to an exemplary embodiment each TP m can be assigned to the cluster $k_m$ in which it is the strongest, i.e., $$k_m = \underset{k}{\operatorname{argmax}}\{\bar{v}_k(m)\}, \qquad (6)$$

thereby the subset $\mathcal{M}_k$ will be given by $\mathcal{M}_k=\{m: k_m=k\}$ for every k∈$\mathcal{K}$.

The number $M_k$ of TPs assigned to each cluster k is independent and time variant. The $M_k$ TPs of cluster k can be employed to perform coordinated transmission and service $J_k^* \leq J_k$ UEs. The Clustering-based Assignment Algorithm (CbAA) is summarized as follows:

---

Clustering-based Assignment Algorithm (CbAA)

Inputs: All strength vectors in $\mathcal{V}$, the number K of clusters to be formed, and the number $J_k^*$ of UEs to be serviced for each cluster k = 1, ..., K.
Output: The coordinated subsets $\mathcal{M}_k$ and $\mathcal{J}_k^*$, for all k ∈ $\mathcal{K}$.
Step 1: Apply the k-means algorithm over all strength vectors in $\mathcal{V}$ to form K clusters, identifying the cluster associated to each UEj, $c_j$ for j = 1, ..., J; UEs associated to cluster k constitute the subset $\mathcal{J}_k$, for all k ∈ $\mathcal{K}$;
Step 2: Calculate the prototype vectors $\bar{v}_k$, for all k ∈ $\mathcal{K}$;
Step 3: Associate a cluster to each TP m in accordance to a pre-defined rule (such as presented in equation (6), however other rules are allowed such as, for example, choosing a given cluster k and assigning its strongest TP m (and removing this TP from subsequent searches), repeating the same procedure for all other clusters and then repeating the entire procedure until all TPs are assigned); TPs associated to cluster k constitute the subset $\mathcal{M}_k$, for all k ∈ $\mathcal{K}$;
Step 4: Select the $J_k^*$ UEs from $\mathcal{J}_k$ to be preferentially serviced, for all k ∈ $\mathcal{K}$, therefore, deriving the subset $\mathcal{J}_k^*$ of UEs.

---

After performing the CbAA, the option exists to enable all clusters simultaneously or to enable a subset of the clusters, deriving the subset $\mathcal{K}^* \subseteq \mathcal{K}$ of enabled clusters. According to an exemplary embodiment, the partial selection of clusters can be made in several ways including: randomly or heuristically, such as based on (1) selection of clusters whose sizes are larger/smaller, (2) selection of clusters whose sum of squares of distances to centroid are larger/smaller, or (3) selection of a cluster based on silhouette values of its observations. Finally, for each enabled cluster k∈$\mathcal{K}^*$, any coordinated transmission technique can be applied to communicate from TPs in $\mathcal{M}_k$ to the UEs in $\mathcal{J}_k^*$. According to an exemplary embodiment, the clustering of the UEs and TPs can occur simultaneously when using the k-means algorithm on the UEs' strength vectors.

According to an exemplary embodiment, each cluster can act as a miniature CoMP-cell. Each cluster can perform joint precoding and/or coordinated data scheduling and/or potential resource allocations as well as other options as desired with a comparable group of cells which can include a plurality of UEs and TPs.

Figure 3:
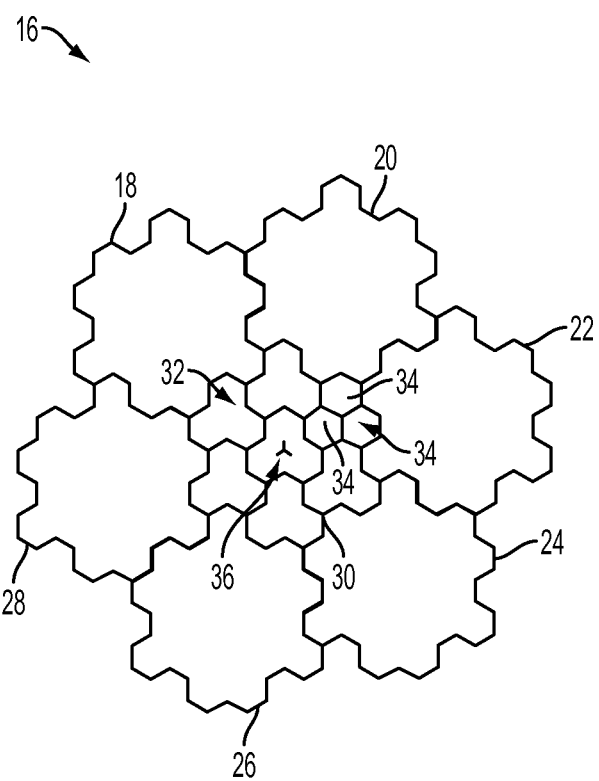
FIG. 3 illustrates a cell scenario with seven Coordinated Multi-Point (CoMP)-cells according to an exemplary embodiment.

Using the above described systems and methods, a purely illustrative example will now be described. For this example, a supercell is represented by a CoMP-cell, which is the geographical area associated to a CoMP set. Together with a fast backhaul, a set of seven CoMP-cells composes the system. Each of the seven CoMP-cells has B Base Stations (BSs), which can be indicated by b=1, 2, ..., B. In its turn, the area associated to a BS is referenced as BS-cell. FIG. 3 shows the system 16 which includes seven CoMP-cells 18, 20, 22, 24, 26, 28 and 30. A set of 7 BS-cells 32 composes a CoMP-cell 30. Each BS-cell 32 is three sectored, with each 120° sector 34 serviced by its own single-antenna TP. The antennas are at a corner shared by the three sectors, as indicated by BS-site 36. Thus, a total of M=21 TPs is present in each CoMP-cell 30. Note that the sectors 34 are modeled as hexagons, whose maximal diameter is given by D=334 m. Additionally, a wrap-around approach can be employed to avoid border effects.

For this example, consider the downlink of the CoMP system 16 in the context of 3GPP LTE Frequency Division Duplexing (FDD), which employs Orthogonal Frequency Division Multiple Access (OFDMA) centered at a carrier frequency of 2 GHz. The downlink bandwidth is split into 300 subcarriers with a spacing of 15 kHz, with equal power allocated among them. The resource elements are arranged into RBs, and an RB is the time-frequency unit comprised by 12 adjacent subcarriers with duration of 1 ms (or equivalently 14 symbols). The CbAA is employed to deal with one RB at a time. According to an alternative exemplary embodiment, the process could work on one group of RBs at a time, which consists of a given number of RBs grouped, contiguously or not, in the frequency domain. In all cases, such individual RBs or groups of RBs correspond to the simply termed "resources" previously used.

For this example, the CbAA is implemented according to the description given above, with the Best Fit algorithm being used at Step 4 of the CbAA for finding the subset $\mathcal{J}_k^*$ of UEs to be preferentially serviced. The Best Fit algorithm finds, in a greedy way the most spatially compatible UEs with respect to the previously admitted ones. For this context, the so called "greedy way" can be described as starting from a first UE the algorithm selects the second UE as the one most spatially compatible with the first UE and then selects the third UE as the UE most spatially compatible with the first and second UEs, iterating as desired. This is performed successively until the group of $J_k^*$ UEs is completed; the first admitted UE is the one with the highest channel gain.

In order to obtain the set $\mathcal{V}$, the system entities could interact with each other as follows:

Step a: via downlink, each UE j∈$\mathcal{J}$, estimates its strength vector, $v_j$;

Step b: via uplink, each UE j∈$\mathcal{J}$ sends $v_j$ to at least one of the coordinated TPs;

Step c: via backhaul, every TP m∈$\mathcal{M}$ sends $v_j$ to the CPU;

Step d: the CPU gathers all $v_j$ into $\mathcal{V}$.

Note that, if the UEs report $v_j$ to more than one TP, the multiple copies of $v_j$ can be suitably combined at the CPU to produce better estimates. Therefore, in some embodiments, UEs report $v_j$ to more than one TP, each UE reports $v_j$ to one TP, or some combination thereof.

Figure 4:
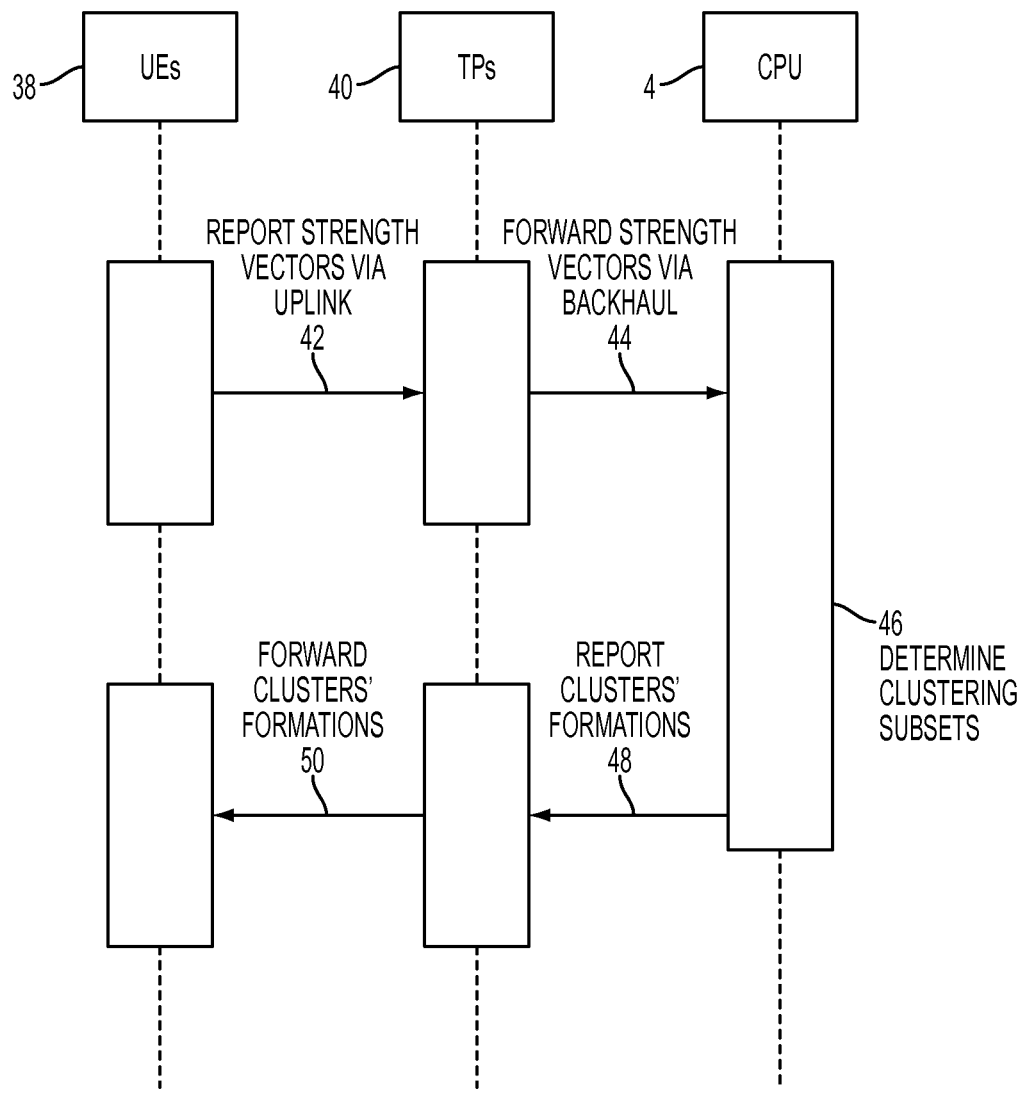
FIG. 4 shows a sequence diagram according to an exemplary embodiment.

At this point, the CbAA can be executed. After clustering, the linear Zero-Forcing (ZF) precoding performs the role of coordinated transmission from every TP m∈$\mathcal{M}_k$ to every UE j∈$\mathcal{J}_k^*$, for all k∈$\mathcal{K}$. While this example uses one coordinated transmission technique, this example does not preclude applying another coordinated transmission technique, such as coordinated beamforming and coordinated scheduling. FIG. 4 shows the sequence diagram of applying CbAA for this example and will now be described.

According to an exemplary embodiment, FIG. 4 includes UEs 38, TPs 40 and the CPU 4. Initially, in step 42, the UEs 38 report strength vectors via uplink to the TPs 40. The TPs, in step 44, forward the strength vectors via backhaul to the CPU 4. The CPU 4, in step 46, determines the clustering subsets. In step 48, the CPU 4 reports the clusters' formations to the TPs 40. The TPs 40, in step 50, forward the clusters' formations to the UEs 38.

According to another exemplary embodiment, the above described systems and methods can also be used for a Time Division Duplexing (TDD) based system. The application of CbAA, in one exemplary embodiment, for a TDD based system, will proceed without modifications being required. According to an alternative exemplary embodiment, when channel reciprocity holds, the steps of estimation and report of strength vectors by the UEs 38 are waived. This is allowable because the RSSs estimation can be performed directly by the TPs 40 in the uplink and used for coordinated transmission in the downlink. Also in this case, multiple copies of $v_j$ can be combined at the CPU 4 to produce better estimates.

According to an exemplary embodiment as described above, despite possible performance losses, the CbAA achieves a number of things including the benefit of reducing the signaling costs and joint processing demands in the communications system 16. Even though the algorithm requires estimates for all the links within the CoMP-cell to form the clusters, just the associated absolute gains are enough for this step to proceed. Once clustering is done, the knowledge required for joint processing concerns only the channel complex coefficients of the links within each cluster. Any information of any link crossing the clusters can be simply neglected. Note that, whenever equation (6) (and its associated strategy) is adopted (or any assignment strategy that favors high RSSs when assigning TPs to clusters), the link information disregarded corresponds exactly to the TPs considered the less relevant in the cluster formation. Thus, a decrease in the signaling and processing demanded to apply some joint precoding technique can be perceived, if compared to the non-clustered case. Such a decrease is even larger for the partial selection of clusters.

For example, suppose that 21 single-antenna UEs are being jointly serviced by 21 single-antenna TPs. Then, assume that these TPs are uniformly partitioned into three clusters of a CoMP-cell, each one with seven exclusive TPs that service seven exclusive UEs. In the latter case, one has to estimate three 7×7 matrices, whereas in the former case the estimation is of one 21×21 matrix. In other words, by doing the clustering, we need only about 33% of all estimates. If a partial selection of clusters is employed instead, even fewer estimates will be required. For instance, if just one of these three clusters is enabled at a time, only eleven percent of all estimates will be required. Therefore, any information about other clusters can be discarded. Additionally, the number of floating-point operations required for matrix inversions on the calculation of the precoding coefficients will be dramatically decreased. For example, in some embodiments, with clustering it is believed that approximately eleven percent of all floating-point operations will be required. If only one of three clusters is enabled, the percentage could be reduced by approximately two thirds.

According to exemplary embodiments, the systems and methods described above have generally been described from the frame of reference of single antenna scenarios, e.g., where the TPs and/or the UEs each have a single antenna. According to other exemplary embodiments, the CbAA can also be applied to multi-antenna scenarios with some modifications being performed as follows. For example, regardless of the number of antennas equipping a single TP, all of the antennas of the single TP need to be associated to a single, same cluster. The RSS from all of the multiple co-located antennas of a single TP are to be combined as a single entry in all of the strength vectors in the $\mathcal{V}$ set. Similarly, regardless of the number of antennas disposed on a single UE, all of the antennas disposed on the single UE are to be associated with a single, same cluster. The RSS from a same TP received at all of the multiple co-located antennas of a single UE are to be combined as a single entry in all of the strength vectors in the $\mathcal{V}$ set.

According to exemplary embodiments, the use of the above described dynamic clustering algorithm allows at least for the following: (1) dynamically adapts the cluster form to temporal variations of the channels and loads; (2) reduces the overall overhead, e.g., UE's feedback, backhaul traffic, and central joint processing, with regard to the non-clustered case; (3) results in a lower complexity than other known algorithms for electing cluster formations; and (4) the partial selection of clusters allows handling the performance/complexity trade-off.

According to an exemplary embodiment, the clustering algorithm is dynamic, i.e., the algorithm can adapt to a given set of conditions. The adaption rate used by the algorithm can be variable. For example, the algorithm can be applied as often as the considered system allows, e.g., at each transmission time interval (TTI). Alternatively, the algorithm could adapt at times only after significant changes are perceived in terms of user and channel dynamics which can depend on the application scenario. This can further reduce the signaling and complexity burden of the system.

Figure 5:
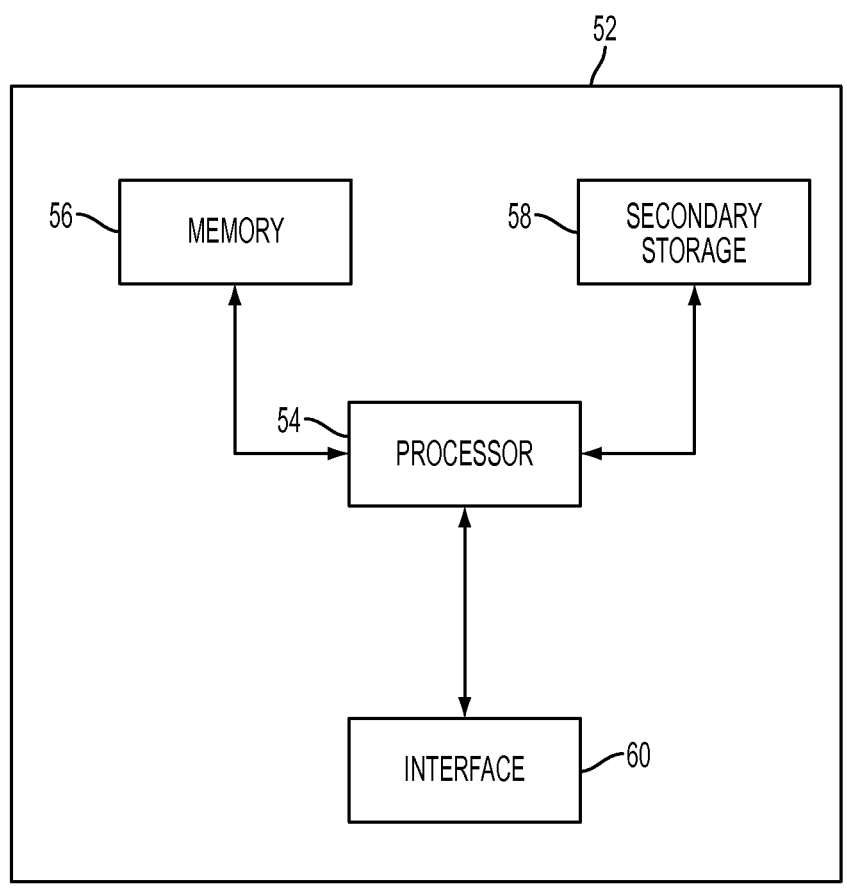
FIG. 5 depicts a central processing unit (CPU) according to an exemplary embodiment.

The exemplary embodiments described above provide for applying a CbAA in a telecommunication system which uses CoMP systems. Exemplary communications node 52, e.g., the CPU 4, which can execute the CbAA and determine clustering subsets, will now be described with respect to FIG. 5. The communications node 52 can contain a processor 54 (or multiple processor cores), memory 56 which can include the CbAA as well as information associated with the layout of clusters within the supercell 2, one or more secondary storage devices 58 and an interface unit 60 to facilitate communications between the communications node 52 and other nodes/devices, e.g., the TPs, that communicate within the supercell 2. The processor 54 can execute algorithms, e.g., the CbAA, other instructions to facilitate the exemplary embodiments described above with respect to improving the efficiency within the supercell 2. Thus, communications node 52 can perform the functions of the CPU 4 as desired. Alternatively, the communications node can be configured to be a UE or a TP.

Figure 6:
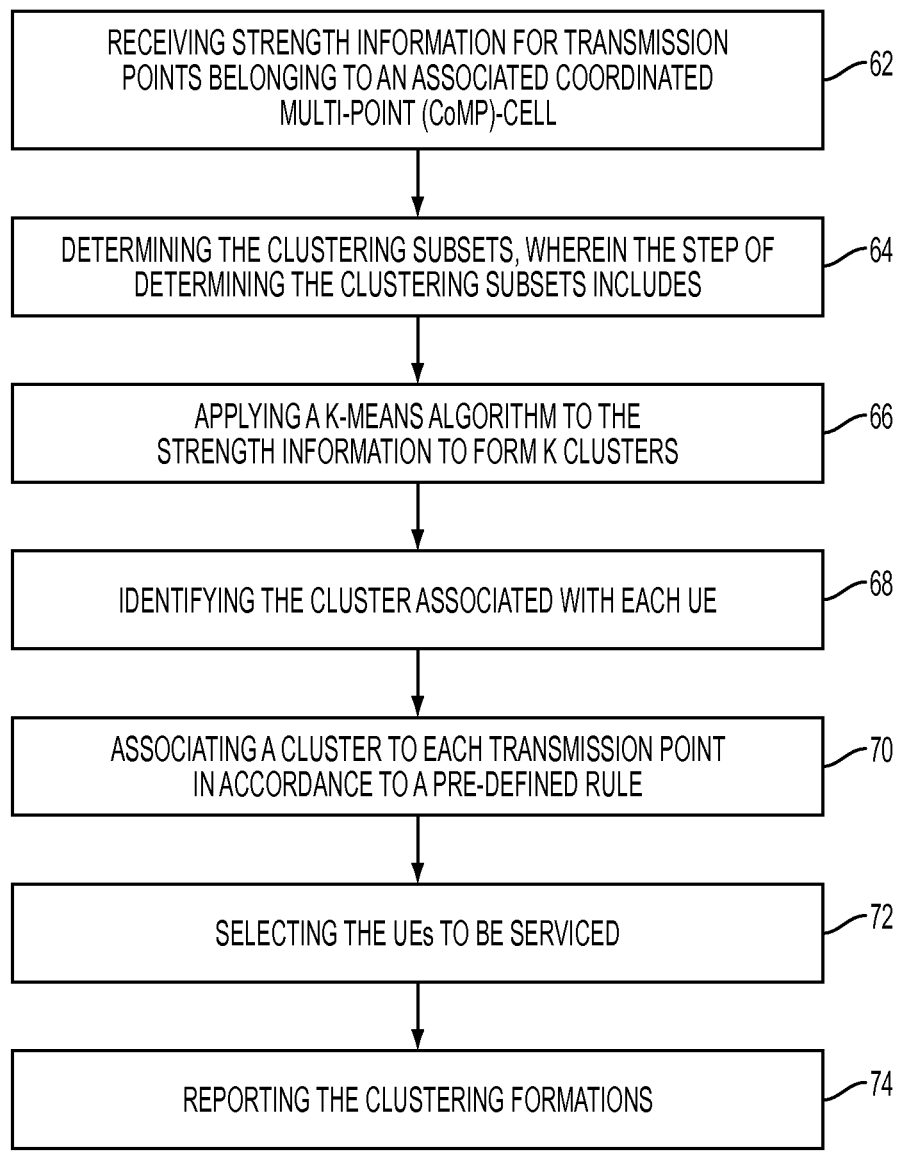
FIG. 6 shows a flowchart of a method according to an exemplary embodiment.

Using the above-described exemplary embodiments, a method for applying a CbAA in a telecommunication system is shown in the flowchart of FIG. 6. The method includes: at step 62, receiving strength information for transmission points belonging to an associated Coordinated Multi-Point (CoMP)-cell; at step 64, determining the clustering subsets, wherein the step of determining the clustering subsets includes: at step 66, applying a k-means algorithm to the strength information to form K clusters; at step 68, identifying the cluster associated with each UE; at step 70, associating a cluster to each transmission point in accordance to a pre-defined rule; at step 72 selecting the UEs to be serviced; and at step 74, reporting the clustering formations.

Figure 7:
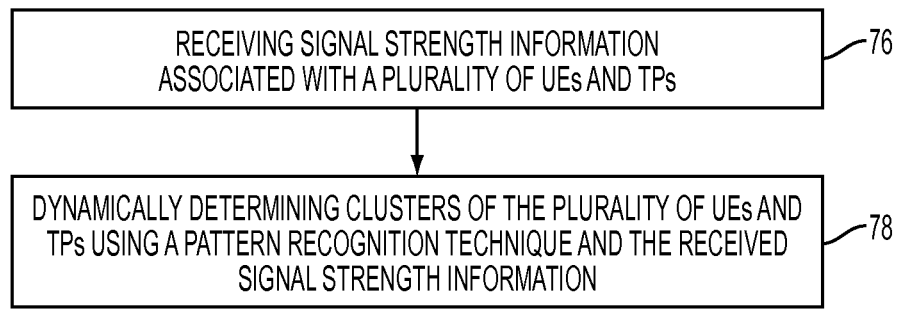
FIG. 7 shows another flowchart of a method according to an exemplary embodiment.

Using the above-described exemplary embodiments, a method for dynamically determining clusters of user equipments (UEs) and transmission points (TPs) in a telecommunication system is shown in the flowchart of FIG. 7. The method includes: at step 76, receiving signal strength information associated with a plurality of UEs and TPs; and at step 78, dynamically determining clusters of the plurality of UEs and TPs using a pattern recognition technique and the received signal strength information.

The disclosed exemplary embodiments provide for dynamically clustering TPs to be used for coordinated transmission which allows for reducing the signaling and the processing involved in CoMP transmission. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

The exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A system for applying a clustering based assignment algorithm (CbAA) in a telecommunication system comprising:
   means for receiving strength information for transmission points belonging to an associated Coordinated Multi-Point (CoMP)-cell;
   means for determining the clustering subsets, wherein the means for determining the clustering subsets includes:
      means for applying a k-means algorithm to the strength information to form K clusters so that the within-cluster sum of squares of the distances to their centroids is minimized, said k-means algorithm being in the form of the equation $$\min_S \sum_k \sum_{v_j \in \mathcal{V}_k} \|v_j - \bar{v}_k\|_2^2, \quad (3)$$

wherein $\|\cdot\|$ denotes Euclidean norm, $v_j$ is the jth strength vector, and $\bar{v}_k$ is the kth prototype vector which corresponds to the centroid over all the strength vectors associated to cluster k;
   means for identifying the cluster associated with each UE;
   means for associating a cluster to each transmission point in accordance to a pre-defined rule; and
   means for selecting the UEs to be serviced; and
   means for reporting the clustering formations.

2. The system of claim 1, wherein the means for selecting the UEs to be serviced further comprises:
   means for starting from a first UE and using an algorithm to select a second UE which is most spatially compatible with the first UE and then the algorithm selects a third UE which is most spatially compatible with the first and second UEs which is performed successively until $J_k^*$ UEs are selected, wherein $J_k$ represents a variable number J associated with a cluster k.

3. A method for dynamically determining clusters of user equipments (UEs) and transmission points (TPs) in a communication system comprising:
   receiving signal strength information associated with a plurality of UEs and TPs;
   dynamically determining clusters of the plurality of UEs and TPs using the received signal strength information so that strength vectors of UEs and/or TPs assigned to a same cluster are more similar to one another than strength vectors of UEs and/or TPs belonging to different clusters, wherein the determining includes
   applying a k-means algorithm to the strength information to form K clusters so that the within-cluster sum of squares of the distances to their centroids is minimized, said k-means algorithm being in the form of the equation $$\min_S \sum_k \sum_{v_j \in \mathcal{V}_k} \|v_j - \bar{v}_k\|_2^2, \quad (3)$$

wherein $\|\cdot\|$ denotes Euclidean norm, $v_j$ is the jth strength vector, and $\bar{v}_k$ is the kth prototype vector which corresponds to the centroid over all the strength vectors associated to cluster k,
   identifying the cluster associated with each UE,
   associating a cluster to each transmission point in accordance to a pre-defined rule, and
   selecting the UEs to be serviced; and
   reporting the clusters.

4. The method of claim 3, wherein the received signal strength information is received strength vectors, wherein each strength vector depends on Received Signal Strength (RSS) estimates of each UE for all TPs belonging to an associated Coordinated Multi-Point (CoMP)-cell.

5. The method of claim 3, wherein the step of dynamically determining clusters of the plurality of UEs and TPs determines a plurality of clusters simultaneously.

6. The method of claim 3, wherein the clusters of the plurality of UEs and TPs are used for at least one of joint precoding and coordinated data transmission scheduling with the clusters of the plurality of UEs and TPs.

7. The method of claim 3, wherein the communication system uses Time Division Duplexing (TDD).

8. The method of claim 3, wherein the communication system uses Frequency Division Duplexing (FDD).

9. The method of claim 3, further comprising:
   enabling a subset of the clusters.

10. The method of claim 3, wherein at least one of the TPs and UEs includes a plurality of antennas.

11. A central processing unit (CPU) for dynamically determining clusters of user equipments (UEs) and transmission points (TPs) in a communication system, the CPU comprising:
   an interface configured to receive signal strength information associated with a plurality of UEs and TPs; and a processor configured to dynamically determine clusters of the plurality of UEs and TPs using the received signal strength information so that strength vectors of UEs and/or TPs assigned to a same cluster are more similar to one another than strength vectors of UEs and/or TPs belonging to different clusters, wherein the processor determines the clusters by:
applying a k-means algorithm to the strength information to form K clusters so that the within-cluster sum of squares of the distances to their centroids is minimized, said k-means algorithm being in the form of the equation $$\min_{S} \sum_{k} \sum_{v_j \in \mathcal{V}_k} \|v_j - \bar{v}_k\|_2^2, \qquad (3)$$

wherein $\|\cdot\|$ denotes Euclidean norm, $v_j$ is the jth strength vector, and $\bar{v}_k$ is the kth prototype vector which corresponds to the centroid over all the strength vectors associated to cluster k, identifying the cluster associated with each UE,
associating a cluster to each transmission point in accordance to a pre-defined rule, and
selecting the UEs to be serviced, and
reports the clusters.

12. The CPU of claim 11, wherein the received signal strength information is received strength vectors, wherein each strength vector depends on Received Signal Strength (RSS) estimates of each UE for all TPs belonging to an associated Coordinated Multi-Point (CoMP)-cell.

13. The CPU of claim 11, wherein dynamically determining clusters of the plurality of UEs and TPs determines a plurality of clusters simultaneously.

14. The CPU of claim 11, wherein the clusters of the plurality of UEs and TPs are used for at least one of joint precoding and coordinated data transmission scheduling with the clusters of the plurality of UEs and TPs.

15. The CPU of claim 11, wherein the communication system uses Time Division Duplexing (TDD).

16. The CPU of claim 11, wherein the communication system uses Frequency Division Duplexing (FDD).

17. The CPU of claim 11, further comprising:
enabling a subset of the clusters.

18. The CPU of claim 11, wherein at least one of the TPs and UEs includes a plurality of antennas.

* * * * *